(12) United States Patent
Körwien et al.

(10) Patent No.: US 12,486,049 B2
(45) Date of Patent: Dec. 2, 2025

(54) DISPLAY APPARATUS AND METHOD FOR MONITORING THE STRUCTURAL INTEGRITY OF A REPAIR LOCATION

(71) Applicant: Airbus Defence and Space GmbH, Taufkirchen (DE)

(72) Inventors: Thomas Körwien, Taufkirchen (DE); Anton Maier, Taufkirchen (DE); Thomas Kruse, Hamburg (DE); Jens Holtmannspötter, Erding (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 1026 days.

(21) Appl. No.: 17/296,398

(22) PCT Filed: Nov. 25, 2019

(86) PCT No.: PCT/EP2019/082450
§ 371 (c)(1),
(2) Date: May 24, 2021

(87) PCT Pub. No.: WO2020/109242
PCT Pub. Date: Jun. 4, 2020

(65) Prior Publication Data
US 2022/0033106 A1     Feb. 3, 2022

(30) Foreign Application Priority Data

Nov. 27, 2018 (DE) .......................... 102018129872.2

(51) Int. Cl.
*B64F 5/40* (2017.01)
*B29C 65/82* (2006.01)
(Continued)

(52) U.S. Cl.
CPC ................ *B64F 5/40* (2017.01); *B29C 73/10* (2013.01); *B29C 73/24* (2013.01); *B64F 5/00* (2013.01);
(Continued)

(58) Field of Classification Search
CPC ...... B64F 5/40; B64F 5/00; B64F 5/60; B29C 73/10; B29C 73/24; B29C 65/8207; G01N 19/04
See application file for complete search history.

(56) References Cited

U.S. PATENT DOCUMENTS

| 3,296,856 | A | * | 1/1967 | Robert | G01N 19/04 |
| | | | | | 156/64 |
| 2004/0020592 | A1 | * | 2/2004 | Dietz | G01N 19/04 |
| | | | | | 156/247 |
| 2005/0006526 | A1 | | 1/2005 | McBroom | |

FOREIGN PATENT DOCUMENTS

| JP | 2005214918 A | 8/2005 |
| JP | 2008256676 A | 10/2008 |
| JP | 200963363 A | 3/2009 |

OTHER PUBLICATIONS

Baker et al. "Advances in the proof test for certification of bonded repairs—Increasing the Technology Readiness Level" Oct. 2015.*
(Continued)

Primary Examiner — Ryan D Walsh
(74) Attorney, Agent, or Firm — Lerner David LLP

(57) ABSTRACT

An indication device for monitoring the structural integrity of a repair location on a laminate structure, produced from a composite material, of a part of an aircraft outer skin is specified. The indication device has at least one elongate, thin indicator strip. The indicator strip is detachably applied
(Continued)

to the outer layer of the laminate structure in the immediate vicinity of the repair location. The indicator strip is designed to indicate a predefined residual strength of an adhesive joint of a repair patch to the surrounding composite material.

13 Claims, 4 Drawing Sheets

(51) Int. Cl.
- *B29C 73/10* (2006.01)
- *B29C 73/24* (2006.01)
- *B64F 5/00* (2017.01)
- *B64F 5/60* (2017.01)
- *G01N 19/04* (2006.01)

(52) U.S. Cl.
CPC ............... *B64F 5/60* (2017.01); *G01N 19/04* (2013.01); *B29C 65/8207* (2013.01)

(56) References Cited

OTHER PUBLICATIONS

Baker Alan et al: "Advances in the proof test for certification of bonded repairs—Increasing the Technology Readiness Level" International Journal of Adhesion and Adhesives. Elsevier. Amsterdam. NL. Bd. 64. 22. Oct. 2015 (Oct. 22, 2015). Seiten 128-141. XP029300262. ISSN: 0143-7496.

Extended European Search Report including Written Opinion for PCT/EP2019/082450 issued Feb. 24, 2020; 16 pages.

Hart-Smith, L..J. et al., "Reliable Nondestructive Inspection of Adhesively Bonded Metallic Structures Without Any Instruments," Proceedings Of The 40th International SAMPE Symposium, Anaheim, May 8-11, 1995.

Heilmann, L. et al., "Proofed Bonding—A Novel Method for Verifying Adhesion in Adhesively Bonded Composite Repairs," Proceeding of the 18th European Conference on Composite Materials, Athens, Jun. 24-28, 2018.

International Search Report for PCT/EP2019/082450 mailed Feb. 24, 2020; 2 pages.

Search Report from Office Action for German Application No. 102018129872.2 issued Nov. 15, 2019; 1 page.

\* cited by examiner

DISPLAY APPARATUS AND METHOD FOR MONITORING THE STRUCTURAL INTEGRITY OF A REPAIR LOCATION

CROSS-REFERENCE TO RELATED APPLICATIONS

The present application is a national phase entry under 35 U.S.C. § 371 of International Application No. PCT/EP2019/082450 filed Nov. 25, 2019, published in German, which claims priority from German Patent Application No. 102018129872.2 filed Nov. 27, 2018, the disclosures of which are incorporated herein by reference.

Various embodiments relate in general to an indication device and to a method for monitoring the structural integrity of a repair location.

For the approval of adhesively bonded structures, a non-destructive test method (NDT) providing strength information is required. This is not being implemented technically at the moment. It is also not possible in many circumstances to implement a "proof load test", for example. Once a repair has been bonded, for example, it is not possible to determine the quality or the residual strength. Test methods in which test specimens are sheared off by torsion are known, for example. The state of the adhesive joint can be determined, for example, from the resulting strength and the fracture pattern. The disadvantage is that, in these methods, the samples do not represent the actual load states of the adhesive joint and are generally very large and, for that reason alone, make fastening to an aircraft outer skin, for example, virtually impossible.

Proceeding from this, it is the object of the invention to provide a device which ameliorates the disadvantages mentioned.

This object is achieved by means of a device having the features and a method having the features described below. Attention is drawn to the fact that the features of the exemplary embodiments of the devices also apply to embodiments of the method and vice versa.

An indication device for monitoring the structural integrity of a repair location on a laminate structure, produced from a composite material, of a part of an aircraft outer skin is specified. The indication device has at least one elongate, thin indicator strip. The indicator strip is detachably applied to the outer layer of the laminate structure in the immediate vicinity of the repair location. The indicator strip is designed to indicate a predefined residual strength of an adhesive joint of a repair patch to the surrounding composite material.

The invention is based on the idea of providing a simple indication device for monitoring the adhesion of a repair patch in a repair location of a laminate structure produced from a composite material. The indication device is able to indicate in a simple and reliable manner a predefined residual strength of the adhesive joint of the repair patch in the repair location in that the indicator strip detaches itself, at least partially for example, and projects from the laminate structure, for example, when a predefined minimum strength is undershot. As a result, simple visual perception is possible during an inspection, for example.

The term residual strength is to be understood as meaning residual adhesion of the adhesive which is still sufficient to hold the repair patch in the repair location in a load-bearing manner. The repair location is preferably a depression in a laminate structure which has been produced, for example, by preferably external damage to the laminate structure. In order to obtain as optimum a repair location as possible, the damaged location is expanded in a defined manner, for example, in order to be able to introduce a prefabricated repair patch with predetermined dimensions into the repair location, for example. Alternatively, it is also possible for the repair patch to be individually tailored to the repair location.

According to a preferred embodiment of the indication device, the indicator strip is composed of a metal, a metal alloy or a fiber composite material. Alternatively, it is also possible to use comparable materials which are suitable for application under a defined prestress and for maintaining this stress over a relatively long period of time.

According to a preferred embodiment of the indication device, the metal comprises, in particular, aluminum, titanium, steel or an alloy of one of the aforementioned metals. The metal or metal alloy is preferably corrosion-compatible.

According to a preferred embodiment of the indication device, the indicator strip has a predefined prestress. The predefined prestress is preferably matched to a target strength to be achieved of the adhesive joint of the repair patch to the surrounding composite material. The indicator strip has a predefined curvature before it is applied to the adhesive joint, for example. During application, it is ensured that the indicator strip is applied to the adhesive joint under a predefined prestress and detaches itself at least partially, preferably independently, when a residual strength of the adhesive joint is reached. Alternatively, the indicator strip can also be partially detached with a predefined tensile force.

According to a preferred embodiment of the indication device, the adhesive joint is brought about by means of an adhesive film. To produce the adhesive film, by means of a film adhesive for example, a layer having a predefined thickness is preferably introduced into the repair location. The film adhesive is preferably applied to a region of extent which extends beyond the repair location. Known film adhesives are, for example, EA9695 or FM300.

According to a preferred embodiment of the indication device, the indicator strip is applied to the cured adhesive joint by means of an adhesive. In order to ensure sufficiently reliable adhesion of the indicator strip to the preferably cured adhesive, a first section of the indicator strip is first of all bonded on with the aid of an adhesive. If the adhesive joint has sufficiently strong adhesion, the prestressed second section of the indicator strip can likewise be applied with an adhesive. The adhesive is preferably a paste adhesive or pasty adhesive. Known paste adhesives are, for example, EA9394 or EA 9395.

According to a preferred embodiment of the indication device, the adhesive has a higher adhesion than the adhesive film of the adhesive joint for the repair patch. In order to indicate a predefined residual strength of the actual adhesive joint of the repair patch in the repair location with the aid of the indicator strip, the adhesive with which the indicator strip is applied has an adhesive force which is preferably higher over the entire period of time than the adhesive joint of the repair patch in the repair location. This has the advantage that, in the event of detachment of the indicator strip, conclusions can be drawn as to the residual strength of the adhesive joint of the repair patch.

According to a preferred embodiment of the indication device, the indicator strip detaches itself at least partially or can be detached when a predefined residual adhesion of the adhesive joint is reached. If the adhesive joint now has only a predefined residual adhesion, the prestressed indicator strip can preferably at least partially detach itself. Alternatively, the indicator strip can also be detached with a predefined tensile force, for example. The at least partially projecting indicator strip is thus capable of indicating that, for example, a predefined residual strength of an adhesive joint has been reached or alternatively even undershot. This is thus an indication to the effect that the adhesive joint of the repair patch in the repair location itself, for example, also now has only a predefined residual strength. For example, a repair patch with an at least partially detached indicator strip would then be tested, replaced or provided with a new adhesive joint at the next opportunity.

According to a preferred embodiment of the indication device, the indicator strip has a predefined breaking point or breaking line. On the basis of a predefined breaking point or breaking line, for example, a desired detachment of the indicator strip, which is prestressed, for example, can take place at a predefined residual strength of the adhesive joint. When a predefined residual strength of the adhesive joint is reached, the indicator strip can break, along the break line, for example, owing to the prestress with which the indicator strip is applied to the adhesive joint. The breaking strength of the indicator strip along the breaking line is preferably matched to the residual strength of the bond, with the result that, for example, the indicator strip detaches itself when the predefined residual strength of the bond is reached and breaks correspondingly easily along the breaking line. This enables the indicator strip to be individually preconfigured.

According to a preferred embodiment of the indication device, the indicator strip is applied to an application region of the adhesive joint which extends beyond the extent of the repair location. In order to detect the residual strength of the adhesive joint, the indicator strip is applied, for example, to the identical adhesive material with which the adhesive joint of the repair patch is made in the repair location. It is possible, for example, for the adhesive joint to be applied in an extended area over the adhesive region of the repair location itself, at least on one side. For example, the extended application region is at least as large as the indicator strip.

According to a preferred embodiment of the indication device, the indicator strip has a thickness of between 0.1 mm and 0.5 mm. As a particular preference, the indicator strip has a thickness of between 0.1 mm and 0.3 mm. The indicator strip preferably has a constant thickness.

According to a preferred embodiment of the indication device, the indicator strip has a ratio of length to width in the range of from 1:2 to 1:10. As a particular preference, the indicator strip has a ratio of length to width in the range of from 1:3 to 1:5.

According to a preferred embodiment of the indication device, the indicator strip has a constant ratio of length to width. According to another preferred embodiment, the indicator strip has at least one first region, which has a first ratio of length to width, and at least one second region having a second ratio of length to width, wherein the first ratio of length to width differs from the second ratio of length to width.

According to a preferred embodiment of the indication device, the indicator strip is introduced into a depression of the composite material. For example, depending on the residual strength or material thickness of the surrounding composite material, at least some of the composite material has been removed at the location of the indicator strip or omitted during the production of the corresponding component. This has the advantage that the indicator strip does not project beyond the composite material and thus allows a more uniform surface.

According to a preferred embodiment of the indication device, the surface of the indicator strip is flush with the surface of the surrounding composite material. The indicator strip is preferably recessed into a depression of the composite material at least to such an extent that it ends at least almost flush to the surrounding material. This has the advantage that there is a uniform surface in the region of the repair location.

Furthermore, a method for monitoring the structural integrity of a repair location is specified. The repair is carried out on a laminate structure produced from a composite material. The laminate structure is part of an aircraft outer skin. The laminate structure is subjected to loads during a flight of the aircraft. The method comprises applying an adhesive film to a repair location of a base structure of composite material. The adhesive film extends on the outermost layer of composite material of the base structure at least partially beyond the repair location into a region of extent. A repair patch is glued to the adhesive film at the repair location. The adhesive joint is cured. An indication device is applied to the region of extent. The indication device has an indicator strip. The indicator strip is designed to indicate a predefined residual strength of the adhesive joint of the repair patch to the surrounding composite material.

In the drawings, the same reference numerals generally refer to the same parts across the various views. The drawings are not necessarily true to scale; instead, the priority is generally to illustrate the principles of the invention. The following description describes various embodiments of the invention with reference to the following drawings, in which.

Figure 5A:
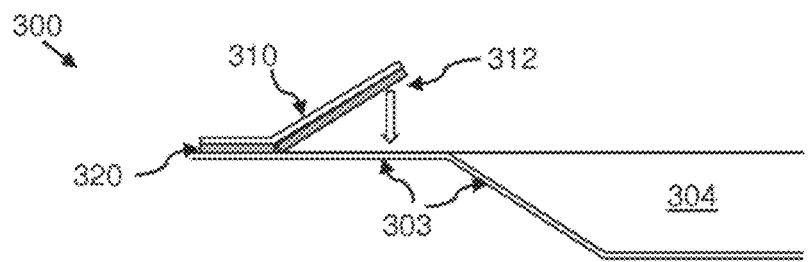
Figure 6:
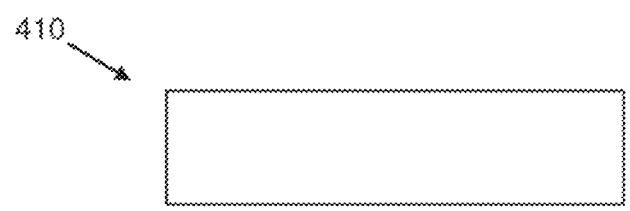

FIGS. 5a and b show various steps of the method for applying an indication device;

FIG. 6 shows a first embodiment of an indicator strip; and

Figure 7:
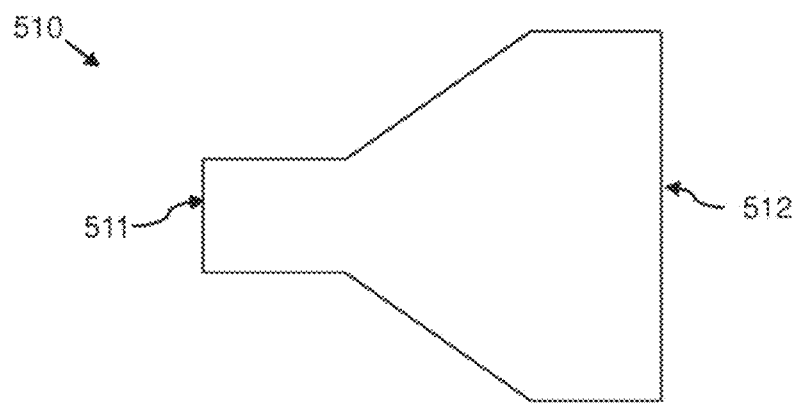

FIG. 7 shows another embodiment of an indicator strip.

The following detailed description refers to the attached drawings, which, for explanatory purposes, show specific details and embodiments in which the invention can be practiced.

The phrase "by way of example" is used herein with the meaning "serving as an example, case or illustration". Any embodiment or refinement described herein as "by way of example" need not necessarily be construed as being preferred or advantageous over other embodiments or refinements.

In the following detailed description, reference is made to the attached drawings, which form part of said description and in which specific embodiments in which the invention can be implemented are shown for the purpose of illustration. In this regard, directional terminology such as "top", "bottom", "forward", "rearward", "front", "rear" etc. are used with reference to the orientation of the figure(s) described. Since components of embodiments can be positioned in a number of different orientations, the directional terminology is used for illustration purposes and is in no way restrictive. It is self-evident that other embodiments can be used and that structural or logical changes can be performed without exceeding the scope of protection of the present invention. It is self-evident that the features of the various illustrative embodiments described herein can be combined with one another, unless specifically stated otherwise. The following detailed description is therefore not to be interpreted in a restrictive sense, and the scope of protection of the present invention is defined by the attached claims.

In the figures, identical or similar elements are provided with identical reference signs where expedient.

Figure 1:
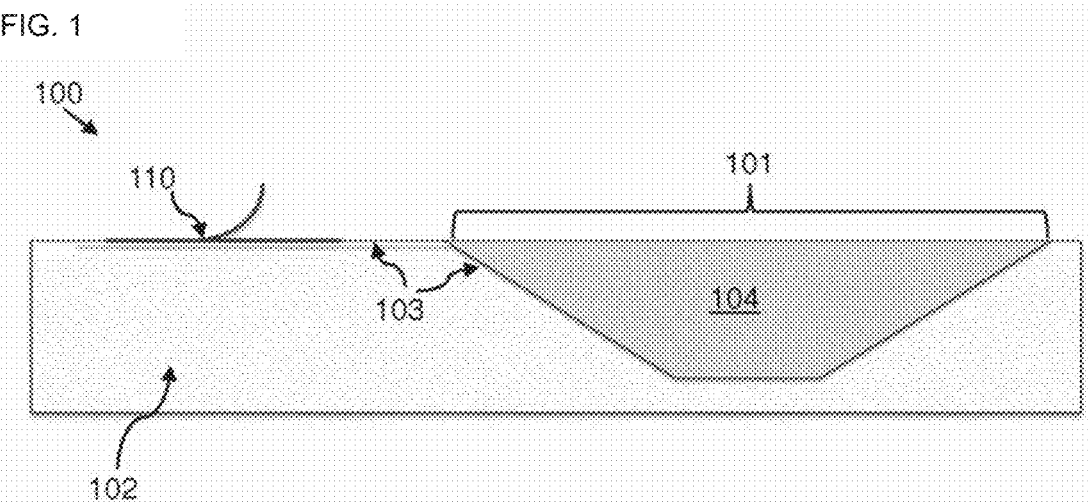
FIG. 1 shows a first embodiment of the indication device.

FIG. 1 shows a first embodiment of an indication device 100 for monitoring the structural integrity of a repair location 101 on a laminate structure, produced from a composite material 102, of a part of an aircraft outer skin. The indication device 100 has an elongate, thin indicator strip 110. The indicator strip is detachably applied to the outer layer of the laminate structure 102 in the immediate vicinity of the repair location 101. The indicator strip (110) is designed to indicate a predefined residual strength of an adhesive joint 103 of a repair patch 104 to the surrounding composite material 102. In order to detect the reliability of a repair of a composite material 102, the indication device 100 has an indicator strip 110, which is applied to a region of extent of the adhesive joint 103 which is extended beyond the repair point 101. When a predefined residual strength of the adhesive joint 103 is reached, the indicator strip 110 detaches itself at least partially from the adhesive joint 103. The indicator strip 110 has been applied to the adhesive joint 103 with a defined prestress and projects at least partially from the composite material 102 when detached. The embodiment of the indication device 100 which is illustrated in FIG. 1 shows the indicator strip 110 in the at least partially detached position in order to indicate that a predefined residual strength of the adhesive joint 103 has been reached and it was thus possible for the indicator strip 110 to detach itself at least partially.

Figure 2:
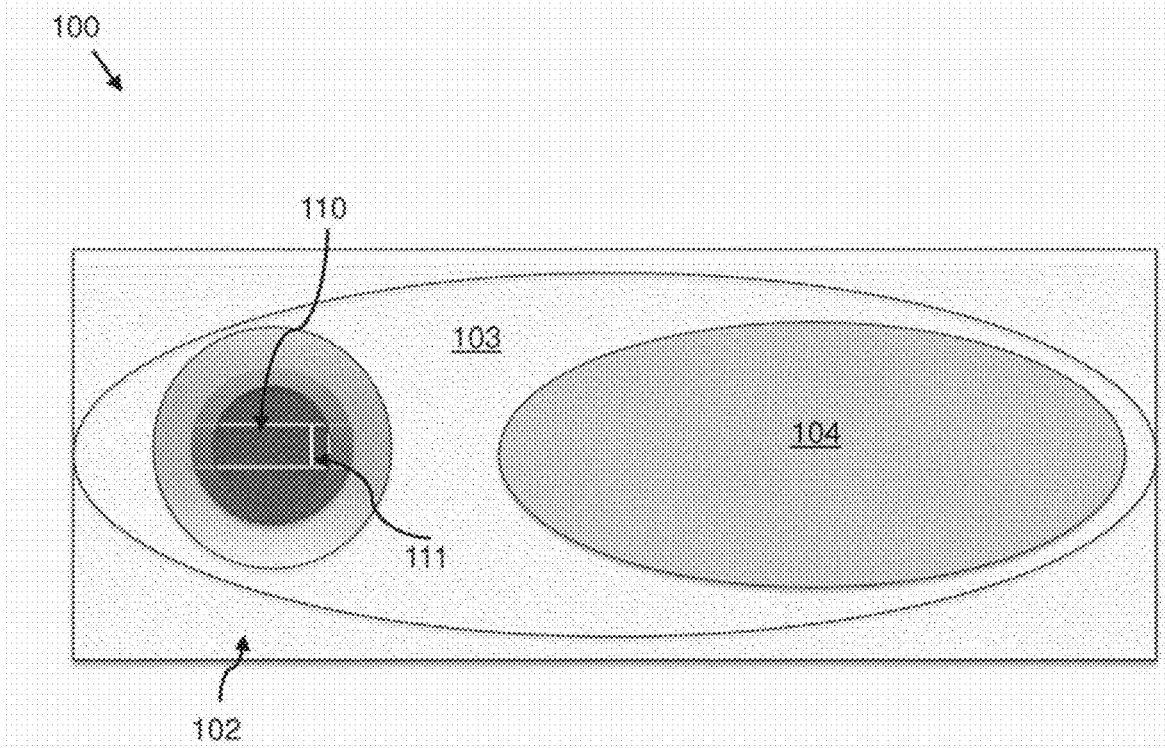
FIG. 2 shows another view of the embodiment illustrated in FIG. 1.

FIG. 2 shows another view of the embodiment illustrated in FIG. 1, showing the indication device 100 in plan view. As can be seen in FIG. 2, the indicator strip 110 is applied to a region of the adhesive joint 103 which extends beyond the actual repair location. In the embodiment shown in FIG. 2, the indicator strip 110 has, by way of example, a circular frame surrounding the indicator strip 110. With the aid of the surrounding frame, the indicator strip can be found more easily during a visual inspection of the laminate structure of an aircraft outer skin. In another preferred embodiment, the indicator strip 110 can also be applied without this frame. In the embodiment shown in FIG. 2, the indicator strip 110 has a predefined breaking line 111. When a predefined residual strength of the adhesive joint 103 is reached, the indicator strip 110 breaks along the breaking line 111 owing to the prestress with which the indicator strip 110 is applied to the adhesive joint 103. The breaking strength of the indicator strip 110 along the breaking line 111 is preferably matched to the residual strength of the adhesive joint 103, with the result that the indicator strip 110 detaches itself when the predefined residual strength of the adhesive joint 103 is reached and breaks correspondingly easily along the breaking line 111.

Figure 3:
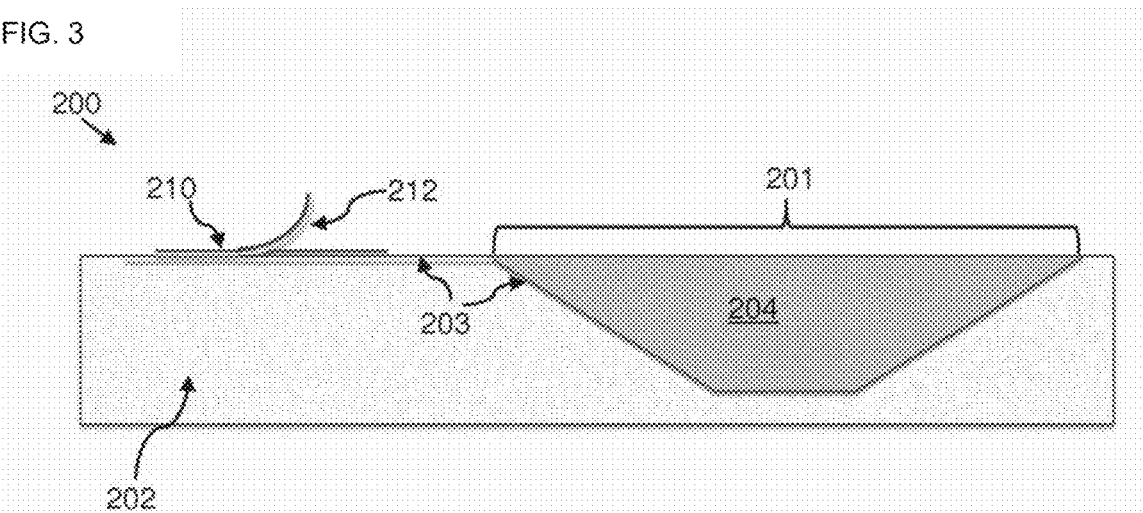
FIG. 3 shows another embodiment of the indication device.

FIG. 3 shows another embodiment of the indication device 200 for monitoring the structural integrity of a repair location 201 on a laminate structure, produced from a composite material 202, of a part of an aircraft outer skin. In the embodiment illustrated in FIG. 3, the indicator strip 210 is illustrated in a partially detached position. On the side of the indicator strip 210 facing the aircraft outer skin, an adhesive 212 is applied, via which the indicator strip 210 is applied to the laminate structure 202 under a predefined prestress. When a predefined residual strength of the adhesive joint 203 is reached, the indicator strip 210 detaches itself at least partially owing to the prestress and thus indicates that a predefined residual strength of the adhesive joint 203 of the repair location 201 has been reached or undershot.

Figure 4:
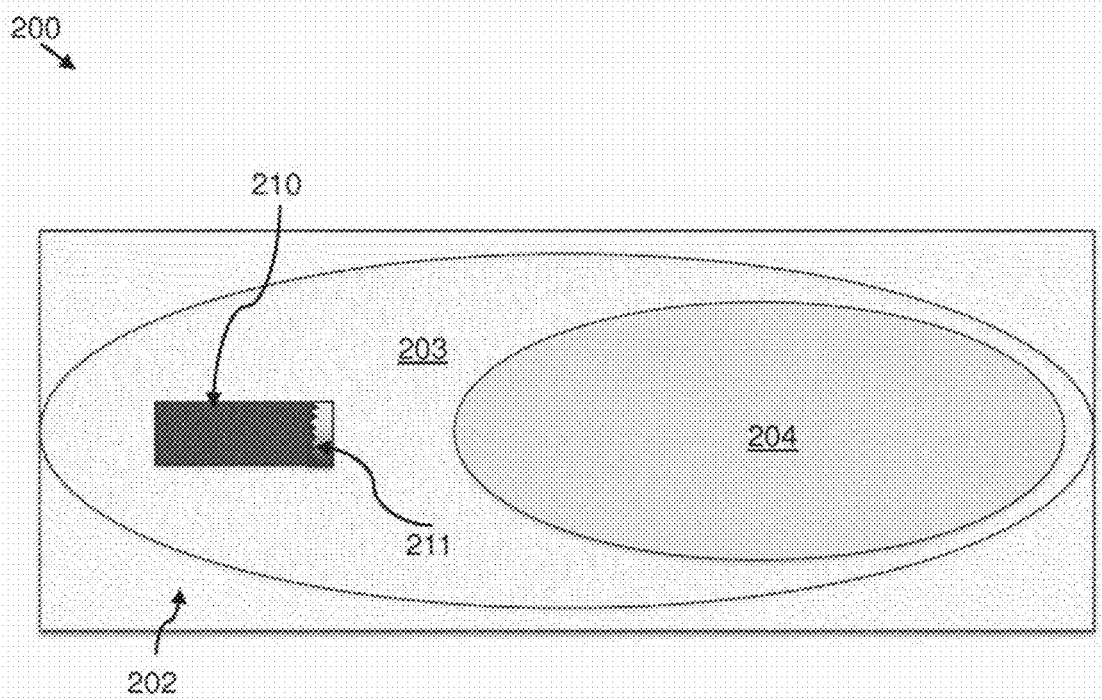
FIG. 4 shows another view of the embodiment illustrated in FIG. 3.

FIG. 4 shows another view of the embodiment of the indication device 200 illustrated in FIG. 3, in plan view. In the embodiment shown in FIG. 4, the indicator strip 210 has a predetermined breaking point 211. In the embodiment illustrated in FIG. 4, the predetermined breaking point 211 is designed as a serrated breaking line. However, according to further embodiments (not shown), the predetermined breaking point 211 can also have any other suitable shape.

FIGS. 5a and b show various steps of the method for applying the indicator strip 310 of an indication device 300 for monitoring the structural integrity of a repair location 301 to a laminate structure produced from a composite material 302.

Figure 5B:
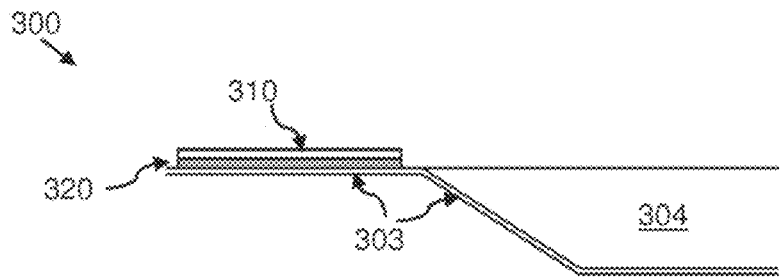

In the method step illustrated in FIG. 5a, a first region of the indicator strip 310, which is under a predefined prestress, is applied to the already cured adhesive joint 303 by means of an adhesive film 320. After the adhesive film 320 has cured, the further region of the indicator strip 310, which is still projecting upward, is likewise applied to the cured adhesive joint 303 by means of an adhesive film 322 and cured. After the adhesive film 322 has cured, the indicator strip 310 is applied flat to the cured adhesive 303, as shown in FIG. 5b. When a predefined residual strength of the adhesive joint 303 is reached, the indicator strip 310 at least partially detaches itself owing to the prestress and projects, for example, as in the embodiment illustrated in FIGS. 1 and 3.

FIG. 6 shows a first embodiment of an indicator strip 410. The embodiment of the indicator strip 410 shown in FIG. 6 has a constant ratio of length to width over the entire length of the indicator strip 410.

FIG. 7 shows another embodiment of an indicator strip 510. The embodiment of the indicator strip 510 shown in FIG. 7 has a different ratio of length to width at the respective ends 511, 512. The embodiments of the indicator strip 410 and 510 shown in FIGS. 6 and 7 are only two of many possible examples of how the shape of the indicator strip 410 or 510 can be formed. The indicator strip 510 preferably has a prestress and at least two regions 511, 512, wherein the indicator strip 510, as illustrated in FIGS. 5a and 5b, is first of all applied with a first region 511 having an adhesive film to a region of extent of the adhesive joint to be detected, and the further region 512 of the indicator strip is applied after the adhesive film has cured.

Although the invention has been shown and described primarily with reference to certain embodiments, it should be understood by those familiar with the art that numerous changes with regard to configuration and details can be made thereto without departing from the essence and scope of the invention as defined by the appended claims. The scope of the invention is thus determined by the appended claims and it is therefore intended that all changes which fall within the wording or the range of equivalence of the claims are included.

LIST OF REFERENCE SIGNS 100, 200, 300, 400 indication device
101, 201 repair location
102, 202 laminate structure
103, 203, 303 adhesive joint
104, 204, 304 repair patch
110, 210, 310, 410, 510 indicator strip
111, 211 breaking line 212, 320, 312 adhesive
511, 512 regions of the indicator strip

The invention claimed is:

1. An indication device for monitoring a structural integrity of a repair location on a laminate structure, produced from a composite material, of a part of an aircraft outer skin,
    wherein the indication device has at least one elongate, thin indicator strip detachably applied to an outer layer of the laminate structure in an immediate vicinity of the repair location; and
    wherein the indicator strip is configured to indicate a predefined residual strength of an adhesive joint of a repair patch to the surrounding composite material,
    wherein the indicator strip has a predefined prestress matched to a target strength to be achieved of the adhesive joint of the repair patch to surrounding composite material, and
    wherein the indicator strip is applied to the cured adhesive joint by an adhesive.

2. The indication device as claimed in claim 1,
    wherein the indicator strip is composed of a metal, a metal alloy or a fiber composite material.

3. The indication device as claimed in claim 2,
    wherein the metal comprises aluminum, titanium, steel or an alloy of one of the aforementioned metals.

4. The indication device as claimed in claim 1,
    wherein the adhesive joint is brought about by an adhesive film.

5. The indication device as claimed in claim 1,
    wherein the adhesive has a higher adhesion than the adhesive film of the adhesive joint for the repair patch.

6. The indication device as claimed in claim 1,
    wherein the indicator strip detaches itself at least partially or is configured to be detached when a predefined residual strength of the adhesive joint is reached.

7. The indication device as claimed in claim 1,
    wherein the indicator strip has a predefined breaking point or breaking line.

8. The indication device as claimed in claim 1,
    wherein the indicator strip is applied to an application region of the adhesive joint extending beyond an extent of the repair location.

9. The indication device as claimed in claim 1,
    wherein the indicator strip has a constant thickness of between 0.1 mm and 0.5 mm.

10. The indication device as claimed in claim 1,
    wherein the indicator strip has a ratio of length to width in the range of from 1:2 to 1:10.

11. The indication device as claimed in claim 1 wherein the indicator strip is introduced into a depression of the composite material.

12. The indication device as claimed in claim 11,
    wherein the surface of the indicator strip is flush with the surface of the surrounding composite material.

13. A method for monitoring the structural integrity of a repair location, wherein the repair has been carried out on a laminate structure produced from a composite material, wherein the laminate structure is part of an aircraft outer skin, wherein the laminate structure is subjected to loads during a flight of the aircraft, wherein the method comprises:
    (a) applying an adhesive film to a repair location of a base structure of composite material, wherein the adhesive film extends on an outermost layer of composite material of the base structure at least partially beyond the repair location into a region of extent;
    (b) gluing a repair patch to the adhesive film at the repair location;
    (c) curing the adhesive joint; and
    (d) applying an indication device having an indicator strip to the region of extent, wherein the indicator strip is configured to indicate a predefined residual strength of the adhesive joint of the repair patch to the surrounding composite material,
    wherein the indicator strip has a predefined prestress matched to a target strength to be achieved of the adhesive joint of the repair patch to surrounding composite material, and
    wherein the indicator strip is applied to the cured adhesive joint by an adhesive.

* * * * *